(12) United States Patent
Okada

(10) Patent No.: US 6,723,356 B2
(45) Date of Patent: Apr. 20, 2004

(54) HIGH QUALITY FERMENTED BOUILLON, AND METHOD FOR PRODUCTION THEREOF

(75) Inventor: Kineo Okada, Tokyo (JP)

(73) Assignee: Ariake Japan Co., Tokyo (JP)

( * ) Notice: Subject to any disclaimer, the term of this patent is extended or adjusted under 35 U.S.C. 154(b) by 82 days.

(21) Appl. No.: 10/190,880

(22) Filed: Jul. 3, 2002

(65) Prior Publication Data

US 2004/0005382 A1 Jan. 8, 2004

(51) Int. Cl.$^7$ ............... A23L 1/313; A23L 1/40; A13B 4/12
(52) U.S. Cl. ............... 426/56; 426/55; 426/589; 426/574
(58) Field of Search ............... 426/55, 56, 589, 426/574, 641

(56) References Cited

U.S. PATENT DOCUMENTS

| | | |
|---|---|---|
| 3,099,562 A | 7/1963 | Rogers |
| 4,009,286 A | 2/1977 | Moll et al. |
| 4,016,295 A | 4/1977 | Burrows et al. |
| 4,276,311 A * | 6/1981 | Burrows et al. ............ 426/56 |
| 4,362,750 A | 12/1982 | Swartz |
| 4,411,991 A | 10/1983 | Hirakawa et al. |
| 4,432,997 A | 2/1984 | Reimerdes |
| 4,587,127 A | 5/1986 | Akao et al. |
| 4,759,933 A | 7/1988 | Uchida et al. |
| 4,820,529 A | 4/1989 | Uchida et al. |
| 4,963,370 A | 10/1990 | Uchida et al. |
| 5,431,940 A | 7/1995 | Calderas et al. |
| 5,459,053 A * | 10/1995 | Rasmussen ............ 435/139 |
| 5,486,367 A | 1/1996 | Fung |
| 5,645,877 A * | 7/1997 | Gaier ............ 426/56 |
| 5,759,598 A * | 6/1998 | Gaier ............ 426/56 |
| 5,773,057 A * | 6/1998 | Singh ............ 426/61 |
| 6,063,410 A | 5/2000 | Vedamuthu et al. |
| 6,077,546 A | 6/2000 | Iritani et al. |
| 6,103,282 A | 8/2000 | Nakashima |
| 6,110,510 A | 8/2000 | Blortz et al. |
| 6,284,243 B1 * | 9/2001 | Masuyama et al. ...... 424/93.45 |

FOREIGN PATENT DOCUMENTS

| JP | 56-109548 | * 8/1981 |
|---|---|---|
| JP | 3-160956 | * 7/1991 |

OTHER PUBLICATIONS

De Marchis, et al "Review: Carnosine–Related Dipeptides in Neurons and Glia" http://wwwprotein.bio.msu.ru/biokhimiya/contents/vgs/full/65070969.htm.

Kaur. et al "Concentration of Anserine and Carnosine in Surimi Wash Water" http://cu fex.com/ift/98annual/accepted/364.htm.

Zhou, et al "Ability of Carnosine Related Dipeptides and Amino Acids to Quench Aldehydic Lipid Oridation Products" http://www.confex.com/1ft/98 annual/accepted/1640.htm.

Huang, et al "Concentrations and Antioxidative of Anserine and Curnosine in Poultry Meat Extracts Treated with Demineralization and Papain" Proc. Natl SciCuunc.Rcc(B), vol. 24, No. 4, 2000 pp 193 261.

* cited by examiner

*Primary Examiner*—Keith Hendricks
(74) *Attorney, Agent, or Firm*—Milde & Hoffberg LLP

(57) ABSTRACT

A method for making a bouillon, comprising providing meat, and meat extract and/or bone extract; lactic acid fermenting at least an extract portion, or further providing lactic acid fermentation products; and dehydrating the mixture of meat and meat extract and/or bone extract. Vegetables and/or spices may also be added. The bouillon is readily extractable in hot water within a short period. A preferred product achieves a target flavor profile of beef consommé.

34 Claims, No Drawings

HIGH QUALITY FERMENTED BOUILLON, AND METHOD FOR PRODUCTION THEREOF

FIELD OF THE INVENTION

The present invention relates to the field of natural food bases; more specifically, fermented bouillon, and its production methods.

BACKGROUND OF THE INVENTION

In order to make beef bouillon or consommé from beef, beef bones, and vegetables for hotel, restaurant, and household use, known techniques require anywhere from several hours to over ten hours to complete the extraction process. Furthermore, the production process requires special skills to monitor the progress, including heat adjustment, scum removal, filtration, liquid clarification, and boiling it down to the proper concentration. The skill level of the person preparing the beef bouillon or consommé has a significant impact on product quality, making it difficult to maintain product uniformity. The resulting product has a characteristic tart flavor, and is spiced in a characteristic manner, well known in the culinary arts.

As used herein, a bouillon shall be interpreted to be a generic term encompassing a soup, bouillon, consommé, broth or stock, or other product intended to be consumed as a liquid, without regard for solids concentration. These products are related as follows. A bouillon and broth are respective French and English terms for boiled meat, fowl or fish soup. A consommé is a clarified broth prepared according to a traditional recipe. A stock is a broth which is used as a starting point for recipes.

Imitation meat bouillon products currently on the market have significant deficits as compared to an authentic beef bouillon and consommé, prepared as discussed above. The imitation products derive their flavor from hydrolyzed or fermented vegetable protein or yeast extract (e.g., autolyzed yeast extract), and seasonings. Any meat component of these products is generally not responsible for the principal flavor characteristics of the products. Other additives may also include spray dried extracted soup stock, amino acids, sugars, and salt. The blended dry product is solidified into cubes and put on the market and used as such. A canned product is also available.

Up to the present time, there have not been any dried beef bouillon products with the same high quality as the beef bouillons made by chefs in hotels and restaurants, which uses natural products for all of its main ingredients, such as beef, vegetables, spices, etc., and which remedies product flaws.

SUMMARY OF THE INVENTION

The present invention provides an improved quick preparation beef bouillon product comprising a mixture of beef, with added meat extract and/or bone extract, which is subjected to lactic acid fermentation and subsequent dehydration. Preferably, vegetables and spices are also added to the fermentation mixture to achieve a desired flavor profile.

It was previously untenable to store a mixture of beef, with added meat extract and/or bone extract, and optionally vegetables and spices, as the resulting product is unpreserved and would be subject to significant bacterial contamination and proliferation. However, by having the mixture of beef, and meat extract and/or bone extract, undergo lactic acid fermentation, preferably to a relatively complete fermentation, the resulting pH is suboptimal for bacterial proliferation, and preferred nutritional substrates are consumed, making the product less susceptible to contamination and spoilage. Drying the product further improves storage stability, especially in non-aseptic packaging. Thus, the product is relatively safe and may be commercially distributed in retail distribution channels.

While it is well known to preserve products by fermentation, for example lactic acid fermentation, typically a resulting product has a high moisture content and includes salt as a preservative to counteract its high water activity. Cured meat products such as sausage typically also include nitrates and nitrites as preservatives, which adds sodium and have a characteristic flavor. Thus, the product according to the present invention differs from previously known fermented meat products. See, U.S. Pat. Nos. 6,110,510, 6,103,282, 6,077,546, 5,486,367, 4,759,933, 4,587,127, 4,432,997, and 4,411,991, expressly incorporated herein by reference.

According to a preferred embodiment of the invention, finely chopped beef is mixed with meat extract, for example from livestock, poultry, seafood, etc., and/or bone extract, vegetables, and spices. The mixture then undergoes lactic acid fermentation. The lactic acid fermentation is used to develop a ripe, rich, and intricate flavor. The product is formed into thin sheets to enhance a dehydration process. After it is dehydrated, the dried material is ground to produce a quick preparation dried beef bouillon product. The present invention provides an easy-to-prepare beef bouillon of consistently high-quality, which can be made by adding the dry products to boiling water, and boiling for a few minutes (1–3 minutes).

It was confirmed that bouillon could be easily produced from the dried product in a short period of time, having a genuinely mature, rich, and intricate flavor. The present invention therefore fulfills its goals of reducing both the required skills and required time for producing bouillon.

Mixed bouillon products emulating a consommé, made from dried beef powder to which such ingredients as beef extract powder and vegetable powder, and possibly lactic acid for tartness, are simply added, have no balance between taste and aroma, lack natural smoothness, and the product quality differs from that of beef bouillon or consommé made according to traditional cooking techniques.

The starting material beef employed in the present invention preferably is provided raw and unprocessed, although various preparation processes may be employed before mixing with the extract. The meat extract and/or bone extract employed in the present invention can be in liquid, powdered, or other form. The vegetables can be in the form of vegetables, vegetable juice, vegetable extract, vegetable extract powder, etc., and the spices can be in the form of spices, spice extract, etc.

According to a preferred method, the mixed ingredients are formed into thin sheets, after they are mixed and/or undergo lactic acid fermentation, in order to improve the drying efficacy during the dehydration process. Of course, various drying methods are available, and thus the desired or optimal form factor will vary in dependence thereon.

A preferred embodiment of the invention provides a dried beef bouillon whose main ingredient is beef and whose taste, aroma, and color is adjusted as desired, for example by altering the amounts of added meat extract and/or bone extract, and/or vegetables, and/or spices, controlling fermentation conditions, and/or the addition of fermentable sugars prior to or during fermentation. A target flavor profile is a traditionally prepared consommé, although it is understood that different flavor profiles may be targeted and emulated as desired.

It is also possible to age the product according to the present invention, for example by delaying dehydration after fermentation. Other known processes may be employed, for example before or after fermentation, or after drying. In particular, the dry product may be employed in subsequent processes to produce useful foodstuffs, either as a replacement for bouillon or consommé in traditional recipes, or in new recipes. It is noted that, since the product is dry, the reconstitution concentration may be adjusted according to the intended use. Likewise, in some cases, a clear broth is desired, and therefore the insoluble portion is retained, while in other cases, the product is used as a flavoring and/or aroma enhancing agent, and the insoluble portion may be consumed. A preferred method for retaining the insoluble portion is by using a paper or non-woven fabric filter, particularly filter materials which are water permeable, which readily allow extraction with hot water. In the former case, the preferred filter is a basket filter, while in later case, the preferred filter is a closed water permeable bag containing the dry product.

Alternately, the present invention provides a dry beef bouillon made from a mixture of beef as the main ingredient with added meat extract and/or bone extract, to which lactic acid fermentation products are added and which is then dehydrated. Preferably, this mixture has a flavor profile which is targeted to emulate traditional beef consommé.

Another aspect of the present invention provides a lactic acid fermented meat extract or bone extract, which has a characteristic tart flavor due to formation of lactic acid, and which has a low sodium content, for example less than 1% by weight, and more preferably less than 0.5% by weight. This low sodium fermented extract is versatile and suitable for a variety of uses, including making soups and bouillon or consommé. For example, the fermented extract may be mixed with beef, dried and powdered, and extracted to produce a bouillon or consommé. Preferably, the sodium concentration is less than about 500 mg per serving, and more preferably less than about 150 mg per serving. A serving size is, for example, 200 ml. A prepared bouillon typically has a moisture protein ratio (MPR) of about 135:1 or more. A typical bouillon or consommé may have over 1000 mg sodium per serving. Thus, the present invention allows low or normal sodium formulations.

Lactic acid fermentation is preferably initiated by inoculation with food grade liquid bacteria cultures and freeze-dried lactic acid bacteria, and cultivated at appropriate temperature and time conditions.

According to the present invention, the main ingredient, beef, may be mixed together with other meat, selected to meet a desired flavor profile, while also meeting other objectives, such as cost constraints, availability, and the like.

Bouillon or consommé products currently on the market are made with large quantities of added salt and artificial seasonings to enhance the otherwise weak flavor. These practices have impaired consumer acceptance. Table 1 shows the results of an analysis of various bouillon products on the market. Mixed bouillon products made from dried beef powder, to which such ingredients as beef extract and hydrolyzed vegetable protein and mono sodium glutamate are simply added, have no balance between their taste and aroma, lack natural smoothness, and their product quality is different from that of beef bouillon made according to traditional cooking techniques.

TABLE 1

Results of analysis of bouillon on the market (%)

| | Crude protein | Monosodium Glutamate | Crude fats | Ash content | Salt content |
|---|---|---|---|---|---|
| Company A's bouillon cube | 8.7 | 9.2 | 2.2 | 58.9 | 54.9 |
| Company B's consommé cube | 7.7 | 8.4 | 4.2 | 43.8 | 41.1 |
| Company C's beef consommé cube | 14.2 | 11.1 | 8.5 | 40.9 | 34.8 |

Through the present invention, a product emulating a traditional consommé made through several hours of careful preparation, can be reliably and simply prepared by boiling a dry product for one to three minutes in water.

The flavor can be readily adjusted by changing the combination of ingredients as well as the types and amounts of meat, added meat extract and/or bone extract, vegetables (celery, onions, carrots, etc.), and spices and/or seasonings. The flavor can also be readily adjusted by changing the amount of sugar added for lactic acid fermentation as well as the temperature and time period used for fermentation. A fermentation culture selection may also play a role in flavor resulting components. Accordingly, the bouillon according to the present invention can be produced in any number of ways to suit consumer preferences.

Furthermore, the food base product according to the present invention contains many anserine and carnosine peptides and amino acids that lower stress, act as antioxidants against harmful free radicals, and provide anti-cancer and anti-aging benefits.

Up until the present, there have not been any dry beef bouillon products that were able to produce the same kind of high quality beef bouillon made by chefs in hotels and restaurants, yet be available in a short period of time without all the time and skilled labor. Furthermore, there have not been any food bases made from meat extract and/or bone extract that undergo lactic acid fermentation and dehydration, having low sodium content.

According to the present invention, extract is made from the meat and/or bones. That is, for example, the meat and its bones are extracted with hot water. This may, of course, be conducted in an industrial scale process. Further, the meat and bones may be extracted separately. The extract is condensed and highly concentrated. Alternatively, it is made into a powdered extract through spray-drying methods, etc. Concentrated meat or beef extracts are available commercially, and these may be employed.

The beef is cut into small pieces. Though the cutting procedure is not critical, a cutter or meat chopper is typically used. The chopped meat is mixed with the meat extract and/or bone extract, vegetables, and spices to make a natural food base. Although the amount of salt added, if any, is not critical, an advantage of the present invention is that storage stable products having quite low sodium concentrations may be produced. Therefore, it is preferred that no salt be added to the product, since this may be added later according to taste.

Following inoculation with lactic acid bacteria, the ingredients are mixed thoroughly, filled into casings, and fermented. The encased mixed ingredients are shaped into thin sheets so that the next process involving dehydration can be carried out efficiently. Specifically, the casings are preferably water permeable, and shaped into 5–20 mm thick slabs. However, the thickness is not limited to this range. Depending on the ingredients used and the dehydration parameters, the mixture can be dehydrated from a thinner or thicker sheet. The fermented mixed ingredients are then preferably aged, for example, for days or weeks, under refrigeration.

Lactic acid fermentation is usually initiated by inoculating liquid cultures or freeze-dried bacteria, and cultivating the inoculated material under proper temperature and time conditions. More specifically, the aforementioned lactic acid fermentation is normally carried out by adding food grade lactic acid bacteria.

Lactic acid fermentation normally involves the use of food grade lactic acid bacteria. Lactic acid bacteria used for fermentation include *Lactobacillus gasseri, Lactobacillus casei, Lactobacillus acidophilus, Lactobacillus sakei* subsp. *sakei, Lactobacillus curvatus, Lactobacillus rhamnosus, Lactobacillus pentosus, Lactobacillus paracasei* subsp. *paracasei, Lactobacillus plantarum, Lactobacillus jugurti, Lactococcus lactis* subsp. *lactis, Lactococcus lactis* subsp. *cremoris. Streptococcus thermophilus, Enterococcus faecium, Bifidobacterium bifidum, Pediococcus pentosaceus* and *Bifidobacterium longum*.

The amount of lactic acid bacteria that is added should normally be within the range of 0.01–0.1% for freeze-dried bacteria and 1–10% for liquid cultures. However, the amount is not necessarily limited within this range. Depending on the materials used or the targeted dry beef bouillon, they may be used in higher or lower concentration. Fermentation is conducted under suitable fermentation conditions at a temperature between about 10–40° C. for 12–48 hours, preferably at the optimum growth temperature for the starter. However, the time period is not limited to this range and, depending on the ingredients used and the targeted flavor profile, fermentation can be carried out for a longer or shorter time period.

Glucose, mannose, fructose, galactose, lactose, sucrose, etc. can be used as sugar sources that are needed for the growth of lactic acid bacteria. In addition, lactic acidity and pH at the completion of fermentation can be controlled by adjusting the sugar concentration for fermentation to an appropriate level. The pH and titratable acidity may be used to monitor progress of fermentation, to ensure that fermentation reaches a desired stage before terminating the process, and to ensure that the process is proceeding normally.

Lactic acidity and pH at the completion of fermentation can also be controlled by adjusting the time for fermentation by lactic acid bacteria. Besides the aforementioned cultured bacteria liquid, starters that are on the market for the production of fermented milk, cheese, fermented sausage, etc. may be used as lactic acid bacteria starters.

For the dehydration process, a forced-air drying method is preferably used, but other methods such as freeze-drying or vacuum-drying can also be used. In the forced-air drying method, the mixed ingredients undergo repeated steps of being dried at a high temperature and being left at a low temperature, thereby improving efficiency in the dehydration process. The reason for this is that when the drying of the mixture is carried out all at one time at high temperature, the surface hardens, impeding the ability of the liquid inside to evaporate. The dehydration process becomes more efficient when the mixture is chopped and ground after reaching a certain level of dehydration, and, then, dried again.

The time of preparation of soup from dried beef bouillon product is shown in Table 2. It was confirmed that over 90% of the extractable content available after 3 minutes was extracted within 2 minutes. This represents a substantial portion of the soluble solids, as well as the desired portion to be extracted during formulation of a bouillon or consommé, which compares favorably to the several hours to over ten hours that up until now were required to produce bouillon, soup, or the like using traditional ingredients. This is therefore a substantial reduction in time. In addition, another clear advantage of the present invention is that it does not require any special technical skills to make bouillon, soup, or the like, so anyone can make them.

TABLE 2

Time of Extraction for Dried Beef Bouillon Powder
BEEF BOUILLON

|  | 1 min | 2 min | 3 min |
| --- | --- | --- | --- |
| ASP | 0.70 | 0.91 | 0.95 |
| THR | 5.38 | 6.47 | 6.61 |
| SER | 4.50 | 5.35 | 5.43 |
| GLU | 22.91 | 28.03 | 28.26 |
| PRO | 1.60 | 0.00 | 1.52 |
| GLY | 4.67 | 5.45 | 5.53 |
| ALA | 19.55 | 23.31 | 23.48 |
| CYS | 0.87 | 0.49 | 0.48 |
| VAL | 5.02 | 6.29 | 6.28 |
| MET | 2.35 | 2.97 | 2.90 |
| ILE | 3.59 | 4.51 | 4.52 |
| LEU | 10.73 | 13.45 | 13.48 |
| TYR | 2.94 | 3.17 | 4.09 |
| PHE | 0.67 | 0.92 | 1.11 |
| LYS | 3.75 | 4.86 | 4.90 |
| HIS | 1.87 | 2.37 | 2.34 |
| ARG | 0.00 | 0.00 | 0.00 |
| TOTAL-AA | 91.10 | 108.55 | 111.88 |
| IMP | 41.46 | 53.75 | 54.95 |
| GMP | 19.59 | 25.56 | 26.47 |
| TOTAL | 152.15 | 187.86 | 193.30 |
| Above values expressed as mg/100 g | | | |
| RATIO (%) | 78.7 | 97.2 | 100.0 |
| BRIX | 2.8 | 3.2 | 3.2 |

20 g Dried bouillon/300 ml Hot water

Percentage extracted: percentage based on 100% extracted after 3 minutes

Through the activity of lactic acid bacteria and aging of the mixed ingredients, the proteins and lipids found in the meat and various extracts result in a intense, mellow, rich, intricate, and aromatic flavor of the dry beef bouillon. Furthermore, the activity of lactic acid bacteria lowers the product's pH, increases its storage stability, and enables safe production and use of the product, without unwanted bacterial proliferation. According to one aspect of the invention, the fermentation process of the bouillon or consommé imparts a unique flavor, which may be recognized by consumers or experts as being comparable (or equivalent) in taste to a traditional bouillon or consommé.

The proliferation of and contamination by undesired strains of bacteria during the production process is restrained by the lowered pH of the mixture resulting from lactic acid fermentation, thus resulting in not only a stabilization of the production process, but an ability to simplify management and usage of equipment, thereby providing industrial advantages.

Though the amounts added for the preparation dosage may be adjusted as necessary, preferably 1 to 20% of dry powder by weight is extracted into hot water, more preferably 5 to 10% by weight, to produce a product having the flavor profile of beef bouillon.

Beef bouillon according to the present invention is preferably made using a mixture of finely chopped beef as a main ingredient with added beef extract and/or beef bone extract, vegetables, and spices, etc., that, after being shaped into thin sheets, undergoes lactic acid fermentation, dehydration, and grinding. Likewise, a pork based product may be produced, which may have a different flavor profile. Other meats and extract sources may also be employed.

The present invention also provides a beef soup comprising a product of a lactic acid fermentation of a beef extract. This soup may be provided in a powdered, or partially or fully hydrated form. According to the present invention, the lactic acid fermentation imparts a tart flavor, with a flavor profile improved over a simple addition of acidifying agents. The water concentration of the soup may be, for example, less than about 50%, providing a highly concentrated product. With a 50% water concentration, the product is a thick syrup, while it is also possible to dry the product to, for example, less than about 5% water concentration, which allows the product to be readily powdered. When said soup is reconstituted to a moisture/protein ratio of about 135:1 or more, said soup has a flavor characteristic of a beef consommé.

The invention is explained in more detail using the following practical examples. However, the intended uses for this invention are not limited to the examples given.

DETAILED DESCRIPTION OF THE PREFERRED EMBODIMENTS

EXAMPLE

Using a meat chopper, 10 kg of beef were minced (6 mm) and blended in a food processor with 1 kg of beef extract and chicken extract, 0.2 kg of various vegetable extracts, and 0.1 kg of sugar (sucrose). Next, 0.01 kg of a lactic acid bacteria starter, *Pediococcus pentosaceus*, was added and mixed with the rest of the ingredients in a mixer.

The thoroughly-blended ingredients were transferred to a stuffer machine, and filled into water-permeable casings to be shaped into thin sheets. The shaped products were placed in an incubator at 25° C. to undergo fermentation for 48 hours.

After the fermentation and aging processes were completed, the mixed ingredients were dehydrated at 70° C. for 12 hours in a forced-air dryer, and then left for 12 hours in an incubator at 15° C., set at a constant humidity of 65%. Next, dehydration in the forced-air dryer was conducted for 12 hours at 60° C., and then left for 12 hours in an incubator at 15° C., set at a constant humidity of 65%, thereby completing the preliminary dehydration process. After this preliminary dehydration process, the mixed ingredients underwent a preliminary grinding in a grinder and were dehydrated for 4 hours at 60° C. to produce powder with a water content of about 5%. This powder was then put back into the grinder to produce a more finely ground powder, thus resulting in the powdered beef bouillon product.

Beef bouillon produced by extracting the dry powder produced by these methods in hot water has a fine, rich, mellow, and aromatic flavor. To confirm the effects of the principal ingredients of meat, meat extract and/or bone extract, and lactic acid bacteria starters, the bouillon was prepared using different combinations of ingredients, after which a sensory evaluation was performed on each of the different soups. To make the soups for the sensory evaluation, the aforementioned beef bouillon were prepared into soups, using a 15:1 water to bouillon ratio, where the bouillon was boiled in water for three minutes. The results of the sensory evaluation, as well as a description of the combination of ingredients for each sample, are shown in Table 3. The results confirmed that the fermentation and aging of the combination of beef, meat and vegetable extracts, and lactic acid bacteria starters, result in the high quality of the final product having a flavor profile which compares favorably to a traditionally prepared beef consommé.

TABLE 3

Results of Sensory Evaluation for the Variations in Composition of Dried Beef Bouillon

|  | Dried Beef Bouillon | Test 1 | Test 2 | Test 3 | Test 4 |
| --- | --- | --- | --- | --- | --- |
| Taste | 5.0 | 2.2 | 3.9 | 2.0 | 1.4 |
| Aroma | 5.0 | 2.3 | 4.0 | 2.6 | 2.0 |

Tests on dried beef bouillon made from various combinations using beef, beef extract, vegetable extract, or lactic acid bacteria starters were conducted as follows:

Test 1: Dried beef bouillon made without beef extract

Test 2: Dried Beef bouillon made without lactic acid bacteria starters

Test 3: Dried Beef bouillon made without beef extract and vegetable extract

Test 4: Dried Beef bouillon made without beef extract, vegetable extract, and lactic acid bacteria starters.

The sensory evaluation was conducted by a panel of nine members who evaluated the soups based on their taste and aroma. The evaluation scores were based on nine different levels for comparing the tastes and aromas of the extracted soup from the modified dried beef bouillon with the regular dried beef bouillon, and are represented as follows: 9 points-extremely good/intense, 8 points-very good/intense, 7 points-moderately good/intense, 6 points-slightly good/intense, 5 points-same as the control (regular dried beef bouillon), 4 points-slightly bad/weak, 3 points-moderately bad/weak, 2 points-very bad/weak, 1 point-extremely bad/weak.

COMPARATIVE EXAMPLE

Traditional beef consommé is prepared by first making the beef bouillon and using that as the soup base to make beef consommé.

Beef Bouillon

Ingredients: 2 kg beef, 1/2 aged chicken, bones from 3 chickens, 1 onion, 1.5 carrots, 1.5 stalks of celery, 2 leeks, 3 cloves of garlic, 2 clove buds, 2 twigs of thyme, one bay leaf, 10 stems of parsley, 20 white peppercorns, and 10 liters of water.

Preparation method: 1) The chicken bones, aged chicken, and beef are placed into a stock pot, and the water is added. 2) The ingredients are kept under high heat until reaching a boil, after which the heat is lowered and the scum and fat at the surface are thoroughly removed. 3) Vegetables and spices are added to the ingredients prepared in step 2) and these ingredients are cooked at a steady boil for 5 hours during which the scum is periodically removed. 4) A fine chinois or cloth is used to slowly filter out fine particles to produce the final product.

Beef Consommé

Ingredients: 500 g beef, 100 g onions, 100 g carrots, 50 g celery, 50 g tomato puree, 10 egg whites, and 3 liters beef bouillon.

Preparation method: 1) Thinly-sliced vegetables, minced meat, tomato puree, and egg whites are put into a pot and kneaded together by hand. 2) The bouillon is added and the pot is put over medium heat while the ingredients are mixed thoroughly until the egg whites start to harden. 3) The heat is lowered, a hole is made in the center of the egg-white layer at the surface, and the ingredients are boiled gently for one hour, after which they are filtered with a cloth.

Beef bouillon made according to the preparation methods above and extracted for 2 hours, 4 hours, and 5 hours as well as beef consommé extracted for 1 hour were compared, and the amount of amino acids and nucleic acids extracted from each of these bouillons and consommé were recorded. For a comparison, the dried beef bouillon was added to water in the amount of 5% by weight and extracted in boiling water for 3 minutes, and the amounts of amino acids and nucleic acids extracted are shown in Table 4. The amounts of glutamic acid, all the amino acids, and inosinic acids were analyzed. The results of the analysis confirmed that the amounts of glutamic acid, all the amino acids, and inosinic acids from the dried beef bouillon subjected to boiling water for three minutes, were the same as what usually takes over five hours to be extracted from beef bouillon prepared according to customary methods. In addition, considering the hours of labor needed for the preparation and subsequent handling of the ingredients, including the cooling time, etc., it was shown that an acceptable beef consommé can be extracted in a much shorter time according to the present invention.

TABLE 4

Analytical Results of Eluted Amounts of Monosodium Glutamate, Amino Acids, and Inosinic Acid According to Time of Extraction for Beef Consommé. Units: mg/100 g

|  | Dried Beef Bouillon | Test 1 | Test 2 | Test 3 | Test 4 |
| --- | --- | --- | --- | --- | --- |
| Monosodium Glutamate | 28.26 | 4.80 | 6.68 | 8.09 | 13.91 |
| Total Amino Acids | 111.88 | 42.81 | 57.21 | 69.16 | 106.23 |
| Inosinic Acid | 54.95 | 18.44 | 22.09 | 24.73 | 50.59 |

Dried beef bouillon Dried beef bouillon, 3 minutes in boiling water

| Dried beef bouillon | Dried beef bouillon, 3 minutes in boiling water |
| --- | --- |
| Test 1 | Beef bouillon extracted in 2 hours |
| Test 2 | Beef bouillon extracted in 4 hours |
| Test 3 | Beef bouillon extracted in 5 hours |
| Test 4 | Beef consommé extracted in 1 hour |

Next, a sensory evaluation was conducted on the dried beef bouillon described above and the beef consommé prepared according to traditional cooking methods. The results of the sensory evaluation are shown in Table 5. In nearly all categories, the dried beef bouillon according to the present invention scored higher than the beef consommé prepared according to traditional methods, confirming that a better soup could be prepared in a shorter amount of time. In the categories of aroma intensity and intensity of characteristic beef consommé smell, the scores for the dried beef bouillon were a little lower than the benchmark product. Presumably, this is due to the significant effect of the flavor of the egg whites that are used in the traditional beef consommé. If required, egg white, egg white extract, or other flavoring components corresponding to egg white may be added to the dried beef bouillon product to remedy this deficiency.

TABLE 5

Sensory Evaluation Results of Dried Beef Bouillon and Tracditional Beef Consommé

|  | Dried Beef Bouillon (Consommé) | Traditional Beef Consommé |
| --- | --- | --- |
| Intensity of aroma | 5.0 | 6.5 |
| Intensity of animal-like smell | 5.0 | 4.8 |
| Intensity of aged aroma | 5.0 | 4.5 |
| Intensity of beef flavor | 5.0 | 5.0 |
| Intensity of characteristic beef consommé odor | 5.0 | 7.1 |
| Intensity of taste | 5.0 | 5.0 |
| Intensity of rich flavor | 5.0 | 5.0 |
| Intensity of intricate flavor | 5.0 | 5.0 |
| Intensity of aged flavor | 5.0 | 4.1 |
| Attractiveness of color | 5.0 | 3.7 |
| Overall rating | 5.0 | 5.6 |

The sensory evaluation was conducted by a panel of nine members who evaluated the beef consommés based on quality of taste and aroma.

The evaluation scores were based on nine different levels as follows: 9 points-extremely good/intense, 8 points-very good/intense, 7 points-moderately/intense, 6 points-slightly good/intense, 5 points-same as the control (dried beef bouillon), 4 points-slightly bad/weak, 3 points-moderately bad/weak, 2 points-very bad/weak, 1 point-extremely bad/weak.

Up to the present, there have not been any food bases capable of delivering high quality beef bouillons as those prepared by chefs in hotels and restaurants, made with a mixture of beef and extracts that is lactic acid fermented and then dehydrated, nor have there been any such dry beef bouillons that were capable of being extracted to make a high quality product in a short amount of time. Furthermore, the lactic acid fermentation results in the control of unwanted bacteria contamination, thereby enabling safe production.

While the above detailed description has shown, described and pointed out the fundamental novel features of the invention as applied to various embodiments, it will be understood that various omissions and substitutions and changes in the form and details of the system and method illustrated may be made by those skilled in the art, without departing from the spirit of the invention. Consequently, the full scope of the invention should be ascertained by the appended claims.

What is claimed is:

1. An edible animal product comprising a lactic acid fermented mixture of meat and an extract selected from the group consisting of one or more of meat extract and bone extract, wherein the total soluble solids content of the extract in the mixture is greater than about 5% of the total weight.

2. An edible animal product comprising a mixture of meat and one or more extract selected from the group consisting of meat extract and bone extract, said mixture being lactic acid fermented and subsequently dried.

3. The edible animal product according to claim 2, wherein beef is a principal ingredient.

4. The edible animal product according to claim 2, wherein said mixture further comprises vegetables, and a mixture of one or more of spices.

5. The edible animal product according to claim 2, wherein a flavor of the edible animal product is adjusted by control over fermentation conditions and the addition of sugar prior to fermentation.

6. The edible animal product according to claim 2, wherein said mixture is aged prior to dehydration.

7. The edible animal product according to claim 2, further comprising seasonings.

8. The edible animal product according to claim 2, wherein said mixture is formed into a thin sheet for dehydration.

9. The edible animal product according to claim 2, wherein the dry powder has a moisture content of less than about 10%.

10. The edible animal product according to claim 2, wherein at least 50% of the extractable nitrogen within the dry powdered edible animal product is extractable in boiling water within 3 minutes.

11. The edible animal product according to claim 2, comprising less than about 5% by weight fat content.

12. The edible animal product according to claim 2, comprising less than about 500 mg by weight sodium per 200 ml of a broth having a moisture/protein ratio of about 135:1 or more.

13. The edible animal product according to claim 2, comprising less than about 150 mg by weight sodium per 200 ml of a broth having a moisture/protein ratio of about 135:1 or more.

14. The edible animal product according to claim 2, wherein an extract in water of said dry product has a flavor profile of a consommé.

15. The edible animal product according to claim 2, having at least 1% by weight of one or more of meat extract and bone extract.

16. The edible animal product according to claim 2, having at least 5% by weight of one or more of meat extract and bone extract.

17. The edible animal product according to claim 2, having at least 10% by weight of one or more of meat extract and bone extract.

18. The edible animal product according to claim 2, characterized by the adjustment of its taste, aroma and color through the alteration of the ratios of the added extract, vegetables, and spices.

19. The edible animal product according to claim 2, having a protein:sodium ratio of at least 3.

20. The edible animal product according to claim 2, have a protein:sodium ratio of at least 9.

21. An edible animal product comprising a dried mixture of meat, and an extract selected from one or more of the group consisting of meat extract and bone extract, said extract being lactic acid fermented.

22. A method for making a bouillon, comprising meat, and an extract selected from the group consisting of one or more of meat extract and bone extract, comprising the steps of:
  (a) lactic acid fermenting the extract and optionally meat; and
  (b) dehydrating a mixture of the fermented extract and meat.

23. The method according to claim 22, further comprising the step of extracting the dehydrated mixture in an aqueous solution.

24. The method according to claim 22, further comprising the step of mixing vegetables and spices with the extract prior to fermentation.

25. The method according to claim 22, further comprising the step of adjusting a taste, aroma, or color of the bouillon by controlling a ratio of meat and extract.

26. The method according to claim 22, further comprising the step of adjusting a flavor of an extract of the dehydrated mixture by controlling fermentation conditions through addition of saccharides prior to or during lactic acid fermentation.

27. The method according to claim 22, wherein the mixture is formed into thin sheets prior to dehydration.

28. The method according to claim 22, wherein said fermenting step comprises inoculation with food grade liquid lactic acid bacteria cultures or freeze-dried lactic acid bacteria, and cultivating at an appropriate temperature for an appropriate time to produce a reduction of pH to below 5.5.

29. A product intended for human consumption comprising a dried mixture of meat and at least about 10% by weight of a lactic acid fermented extract selected from the group consisting of one or more of meat extract and bone extract, having less than about 1% by weight sodium.

30. A beef soup comprising a lactic acid fermented mixture of meat and an extract selected from the group consisting of one or more of meat extract and bone extract, wherein the total soluble solids content of the extract in the mixture is greater than about 5% of the total weight of the fermented mixture.

31. The beef soup according to claim 30, wherein said beef soup has a tart flavor.

32. The beef soup according to claim 30, wherein said soup is concentrated to a water concentration of less than about 50%.

33. The beef soup according to claim 30, wherein said soup is powdered.

34. The beef soup according to claim 30, wherein when said soup is reconstituted to a moisture/protein ratio of about 135:1 or more, said soup has a flavor profile of a beef consommé.

* * * * *